Feb. 9, 1932. G. A. KIFFE 1,844,511
MOUNTING FOR FLEXIBLE CORDS
Filed Oct. 18, 1929
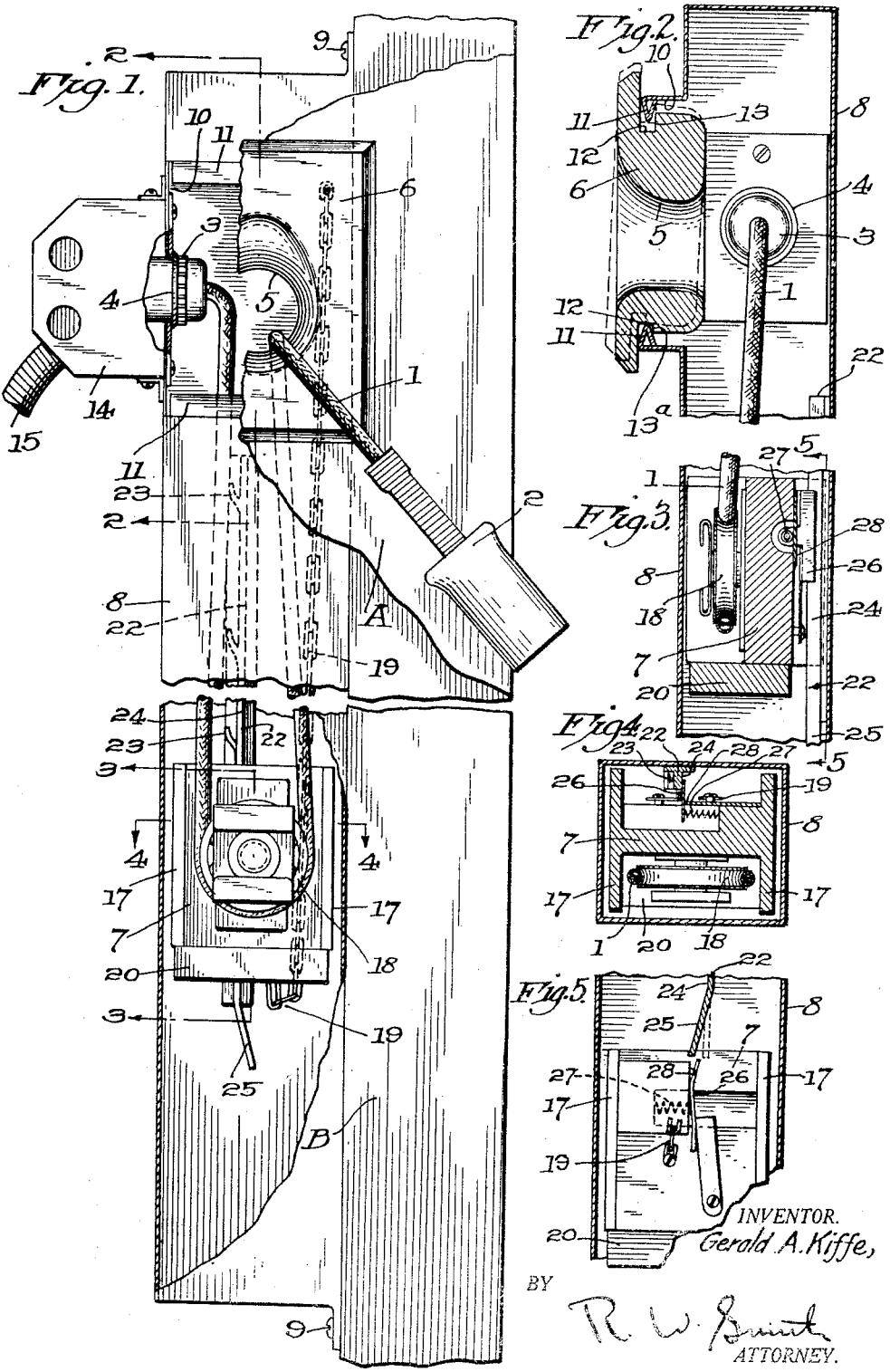
INVENTOR.
Gerald A. Kiffe,
BY
R. W. Smith
ATTORNEY.

Patented Feb. 9, 1932

1,844,511

UNITED STATES PATENT OFFICE

GERALD A. KIFFE, OF LOS ANGELES, CALIFORNIA

MOUNTING FOR FLEXIBLE CORDS

Application filed October 18, 1929. Serial No. 400,629.

This invention is a mounting for a flexible conduit or cord such as an electric cord used for household electric appliances; and it is the object of the invention to so mount the electric cord or the like as to provide for its retraction in a suitable housing when the cord is not in use and ready withdrawal of the cord from the housing when it is to be connected to an electric appliance such as an iron.

It is a further object of the invention to tension the electric cord so that when it is released it is automatically retracted but may be readily withdrawn against the tension when the cord is to be used, with the tensioned mounting for the cord so arranged as to avoid the possibility of a short-circuit in the event of the insulating covering of the cord being worn through, and the tensioned support also providing for ready interchangeable mounting of various cords such as are used for different electric appliances.

It is a still further object of the invention to provide for automatically holding the cord against retraction after a desired length has been withdrawn and even if the pull exerted on the cord is released, and to also provide for conveniently releasing said holding means so that the entire length of cord may be automatically retracted when so desired.

Further objects of the invention will be readily understood from the following description of the accompanying drawings, in which:

Fig. 1 is a front elevation of a construction embodying the invention, partly in vertical section.

Figs. 2 and 3 are vertical sections on the lines 2—2 and 3—3 respectively of Fig. 1.

Fig. 4 is a horizontal section on the line 4—4 of Fig. 1.

Fig. 5 is a vertical section on the line 5—5 of Fig. 3.

The invention is illustrated as employed in connection with a flexible conduit comprising a usual electric cord adapted to supply electric energy to a household electric appliance, although it will be obvious that the invention is applicable to any type of flexible cord or conduit it may be desired to withdraw and retract to operative and inoperative position. The electric cord is illustrated as provided at one end with a usual quick-detachable socket member 2 adapted to be connected to an electric appliance such as an iron or the like, and is provided at its opposite end with a usual plug 3 adapted for quick-detachable connection to a usual outlet socket 4.

The socket 4 is shown mounted in the hollow interior of a wall of a room, and the end 3 of the electric cord is plugged into the socket 4 with the opposite end 2 of the cord projecting outwardly through an opening 5 formed in a suitable face plate 6 which may be mounted in a corresponding opening in the plastered surface A of the wall of the room, so that the cord may be retracted within the hollow wall or may be withdrawn through opening 5 to its operative position.

A sliding member 7 engages a bight of the electric cord as shown in Fig. 1 and is vertically slidable in the hollow interior of the wall for retracting or projecting the cord by elongating or shortening its bight, and the member 7 is preferably guided in a vertically elongated housing 8 which may be fixed in the hollow interior of the wall by mounting the housing against one of the studs B of the wall. The housing may be held in place by suitable fastening means 9.

The housing 8 is preferably provided adjacent its upper end with a flanged opening 10, with the flange of said opening projecting through a suitable opening in the plastered surface A and adapted for detachable engagement by the face plate 6 so that the plate overlies the opening and fits snugly against the plastered surface of the wall. As an instance of this arrangement the flanged opening 10 is preferably rectangular, with that portion of the flange which is at the upper and lower sides of the rectangle forming spring lips 11, and the back of face plate 6 is grooved at 12 for reception of lips 11, with the rear walls of said grooves forming lips 13—13ª of such vertical width as to permit the lip 11 at the upper side of opening 10 being engaged in its corresponding groove 12 as shown in dotted lines in Fig. 2, so that the lip 13ª at the bottom of plate 6 may be slipped over its corresponding lip 11 for vertical alinement of said lower lip 11 with its groove 12, whereupon the face plate 6 may be lowered so as to operatively engage the lower lip 11 by its lip 13ª while still retaining the lip 13 at the top of the face plate in operative engagement with its corresponding lip 11 as shown in full lines in Fig. 2. The face plate is thus locked in place but may be readily released by elevating the plate so as to release its lower lip 13ª and then withdrawing the plate, lower end foremost.

The socket 4 is preferably mounted in a wall of housing 8 adjacent the opening 10, so that when face plate 6 is removed the socket 4 is accessible through opening 10 for inserting the plug 3 of cord 1, and a usual electric inlet box 14 is preferably mounted on the exterior of housing 8 so as to overlie the projecting socket 4. A usual electric conduit 15 leads into box 14 and is electrically connected to socket 4.

The member 7 which is adapted for vertical movement in housing 8 preferably includes guides 17 at the sides of the member forming recesses in the front and rear surfaces of said sliding member as shown in Fig. 4. An open pulley 18 is mounted in the recess at the front of the sliding member and is adapted to receive the bight of cord 1, with the spacing between the periphery of the pulley and the guides 17 so restricted as to permit the bight of the cord being readily slipped over the pulley but then preventing accidental disengagement of the cord.

A flexible support such as a chain 19 is preferably suspended from the upper end of housing 8 with the lower end of the chain connected to sliding member 7 at the recess which is formed in the rear surface of said member, and the slack of the chain thus hangs down through the recess as shown in Fig. 1 so as not to obstruct vertical movement of member 7 when the parts are operatively assembled, but in the event of member 7 being accidentally dropped in housing 8 prior to engagement of pulley 18 by the bight of the electric cord, the chain provides a convenient means for elevating the sliding member to the opening 10 where it is accessible for looping the electric cord around the pulley.

The sliding member 7 is preferably weighted as shown at 20 in order to provide the desired tension on cord 1 for automatically retracting the cord when its projecting end 2 is released, and the housing 8 preferably provides for sufficient vertical travel of member 7 to permit either withdrawal of substantially the entire length of the cord, in which case the member 7 will have been elevated to a point just below opening 5, or complete retraction of the cord until arrested by abutment of its enlarged socket member 2 against the wall of opening 5, in which case the member 7 will have been lowered to substantially the bottom of housing 8.

Means are preferably provided whereby the electric cord may be automatically held against retraction as successive portions of its length are withdrawn, with said holding means adapted for release when so desired in order to permit free retraction of the cord. In the present embodiment of the invention the holding means is released by pulling upon the electric cord so as to withdraw it beyond its normal limit of projection, and then releasing the cord for retraction by the weight of member 7.

As an instance of this arrangement a vertically extending rib 22 projects into housing 8 and is received in the space formed by the recessed rear surface of member 7, with the rib of a length which will just permit vertical travel of the sliding member 7 beyond the respective ends of the rib. Along one of its faces the rib is provided with vertically spaced ratchet teeth 23, while the opposite face of the rib presents a non-toothed surface 24, and the lower end of the rib forms a spring finger 25 normally projecting downwardly at an obtuse angle from the surface 24 as shown in Figs. 1 and 5.

The rib 22 is adapted for engagement by a pawl 26 which is pivoted on the recessed rear surface of member 7, and a spring 27 tends to yieldably project the pawl until it is stopped by an abutment 28, in which position the pawl is adapted to slide along the non-toothed surface 24 of the rib, and thus offers no obstruction to free downward travel of member 7. As the member 7 approaches its lower limit of travel the pawl 26 engages and retracts spring finger 25 as shown on dotted lines in Fig. 5, in order to permit passage of the pawl, and when the member 7 has reached its extreme lower limit of travel the pawl 26 will have moved beyond and disengaged spring finger 25 so that the spring finger returns to normal position as shown in Fig. 5, and the pawl is thus engaged by the opposite side of the spring finger at the start of upward travel of member 7, and is consequently retracted against the tension of its spring 27 and bears against the toothed surface 23 of the rib throughout the upward travel of the sliding member. During said upward travel the pawl readily yields so as to pass the successive teeth 23 and thus permit withdrawal of cord 1, but if the cord is released the spring projected pawl will engage the next lower tooth 23 and will thus hold member 7 against downward travel in order to arrest retraction of the cord.

The uppermost tooth 23 is preferably spaced slightly from the upper end of rib 22 so as to hold the cord 1 against retraction when withdrawn to a point just short of its limit of movement, and in order to release the cord for free retraction it is first withdrawn the remaining short distance to its limit of movement, so that pawl 26 moves upwardly beyond rib 22 and is thus free for spring projection and impingement against abutment 28, in which position the pawl will slide downwardly along the nontoothed surface 24 of the rib when the electric cord is subsequently released, thereby permitting free retraction of the cord. The electric cord may thus be partially or just short of fully withdrawn and automatically held in desired position, and by completing the withdrawal of the cord to its extreme limit of movement it is automatically released for unobstructed free retraction upon release of the cord.

I claim:

1. In combination, a flexible cord fixed at one end, a retaining member, a sliding member engaging a bight of said cord and adapted for reciprocation relative to the retaining member so as to elongate or shorten said bight and thereby retract or allow projection of the opposite end of the cord, the sliding member being arranged so as to yieldably tend to move in the direction for elongating the bight of the cord, and means on the sliding member adapted to engage the retaining member for holding the sliding member short of its limit of movement in said direction.

2. In combination, a flexible cord fixed at one end, a retaining member, a sliding member engaging a bight of said cord and adapted for reciprocation relative to the retaining member so as to elongate or shorten said bight and thereby retract or allow projection of the opposite end of the cord, the sliding member being arranged so as to yieldably tend to move in the direction for elongating the bight of the cord, means on the sliding member adapted to engage the retaining member for holding the sliding member short of its limit of movement in said direction, and means for releasing said holding means.

3. In combination, a flexible cord fixed at one end, a sliding member engaging a bight of said cord and adapted for reciprocation so as to elongate or shorten said bight and thereby retract or allow projection of the opposite end of the cord, the sliding member being arranged so as to yieldably tend to move in the direction for elongating the bight of the cord, teeth spaced from one another in the direction of reciprocation of the sliding member, and a pawl on the sliding member adapted for operative cooperation with the teeth so as to ride over said teeth when the sliding member is reciprocated in the direction for shortening the bight of the flexible cord and adapted to engage one of said teeth for holding the sliding member against reciprocation in the direction for elongating said bight.

4. In combination, a flexible cord fixed at one end, a sliding member engaging a bight of said cord and adapted for reciprocation so as to elongate or shorten said bight and thereby retract or allow projection of the opposite end of the cord, the sliding member being arranged so as to yieldably tend to move in the direction for elongating the bight of the cord, teeth spaced from one another in the direction of reciprocation of the sliding member, a pawl on the sliding member adapted for operative cooperation with the teeth so as to ride over said teeth when the sliding member is reciprocated in the direction for shortening the bight of the flexible cord and adapted to engage one of said teeth for holding the sliding member against reciprocation in the direction for elongating said bight, and means for shifting the pawl to inoperative position with relation to the teeth.

5. In combination, a flexible cord fixed at one end, a sliding member engaging a bight of said cord and adapted for reciprocation so as to elongate or shorten said bight and thereby retract or allow projection of the opposite end of the cord, the sliding member being arranged so as to yieldably tend to move in the direction for elongating the bight of the cord, teeth spaced from one another in the direction of reciprocation of the sliding member, a pawl on the sliding member adapted for operative cooperation with the teeth so as to ride over said teeth when the sliding member is reciprocated in the direction for shortening the bight of the flexible cord and adapted to engage one of said teeth for holding the sliding member against reciprocation in the direction for elongating said bight, means for automatically shifting the pawl to inoperative position with relation to the teeth when the sliding member reaches its limit of reciprocation in the direction for shortening the bight of the flexible cord, and means for automatically shifting the pawl to operative position with relation to the teeth when the sliding member reaches its opposite limit of reciprocation.

6. In combination, a flexible cord fixed at one end, a sliding member engaging a bight of said cord and adapted for reciprocation so as to elongate or shorten said bight and thereby retract or allow projection of the opposite end of the cord, the sliding member being arranged so as to yieldably tend to move in the direction for elongating the bight of the cord, a rib extending in the direction of reciprocation of the sliding member, teeth on one side of the rib spaced from one another in the direction of reciprocation of the sliding member, a pawl on the sliding member adapted to be shifted to position for operative cooperation with the teeth so as to ride over said teeth when the sliding member is reciprocated in the direction for shortening the bight of the flexible cord and adapted to engage one of said teeth for holding the sliding member against reciprocation in the direction for elongating said bight, means for automatically shifting the pawl to position for engaging the non-toothed side of the rib when the sliding member reaches its limit of reciprocation in the direction for shortening the bight of the flexible cord so as to permit free movement of the sliding member in the direction for elongating the bight of the cord, and means for automatically shifting the pawl to position for operative cooperation with the toothed side of the rib when the sliding member reaches its opposite limit of reciprocation.

In testimony whereof I have affixed my signature.

GERALD A. KIFFE.